(12) United States Patent
Munro et al.

(10) Patent No.: US 11,288,444 B2
(45) Date of Patent: Mar. 29, 2022

(54) OPTIMIZATION TECHNIQUES FOR ARTIFICIAL INTELLIGENCE

(71) Applicant: 100.co, LLC, Miami Beach, FL (US)

(72) Inventors: Robert J. Munro, San Francisco, CA (US); Schuyler D. Erle, San Francisco, CA (US); Jason Brenier, Oakland, CA (US); Paul A. Tepper, San Francisco, CA (US); Tripti Saxena, Cupertino, CA (US); Gary C. King, Los Altos, CA (US); Jessica D. Long, San Francisco, CA (US); Brendan D. Callahan, Philadelphia, PA (US); Tyler J. Schnoebelen, San Francisco, CA (US); Stefan Krawczyk, Menlo Park, CA (US); Veena Basavaraj, San Francisco, CA (US)

(73) Assignee: 100.co, LLC, Miami Beach, FL (US)

( * ) Notice: Subject to any disclaimer, the term of this patent is extended or adjusted under 35 U.S.C. 154(b) by 0 days.

(21) Appl. No.: 17/119,902

(22) Filed: Dec. 11, 2020

(65) Prior Publication Data

US 2021/0232760 A1 Jul. 29, 2021

Related U.S. Application Data

(63) Continuation of application No. 16/198,453, filed on Nov. 21, 2018, now abandoned, which is a
(Continued)

(51) Int. Cl.
*G06N 20/00* (2019.01)
*G06F 40/169* (2020.01)
(Continued)

(52) U.S. Cl.
CPC ......... *G06F 40/169* (2020.01); *G06F 3/0482* (2013.01); *G06F 16/243* (2019.01);
(Continued)

(58) Field of Classification Search
CPC ........ G06F 40/169; G06F 40/30; G06F 40/40; G06F 40/42; G06F 40/137; G06F 40/221;
(Continued)

(56) References Cited

U.S. PATENT DOCUMENTS

| 7,730,113 B1* | 6/2010 | Payette .................. G06Q 10/00 707/821 |
| 2008/0040362 A1* | 2/2008 | Aucouturier ............ G06F 16/68 |

(Continued)

OTHER PUBLICATIONS

Piyush Rai, Active Learning, Nov. 10, 2011, Utah University, pp. 1-24.

*Primary Examiner* — Keith D Bloomquist
(74) *Attorney, Agent, or Firm* — Stetina Brunda Garred and Brucker

(57) ABSTRACT

Methods, apparatuses and computer readable medium are presented for generating a natural language model. A method for generating a natural language model comprises: selecting from a pool of documents, a first set of documents to be annotated; receiving annotations of the first set of documents elicited by first human readable prompts; training a natural language model using the annotated first set of documents; determining documents in the pool having uncertain natural language processing results according to the trained natural language model and/or the received annotations; selecting from the pool of documents, a second set of documents to be annotated comprising documents having uncertain natural language processing results; receiving annotations of the second set of documents elicited by second human readable prompts; and retraining a natural
(Continued)

language model using the annotated second set of documents.

20 Claims, 13 Drawing Sheets

Related U.S. Application Data continuation of application No. 14/964,520, filed on Dec. 9, 2015, now abandoned.

(60) Provisional application No. 62/089,745, filed on Dec. 9, 2014, provisional application No. 62/089,747, filed on Dec. 9, 2014, provisional application No. 62/089,736, filed on Dec. 9, 2014, provisional application No. 62/089,742, filed on Dec. 9, 2014.

(51) Int. Cl.

| | |
|---|---|
| *G06F 16/35* | (2019.01) |
| *G06F 16/93* | (2019.01) |
| *G06F 16/242* | (2019.01) |
| *G06F 16/28* | (2019.01) |
| *G06F 16/36* | (2019.01) |
| *G06F 16/951* | (2019.01) |
| *G06F 16/332* | (2019.01) |
| *G06F 16/2453* | (2019.01) |
| *G06Q 50/00* | (2012.01) |
| *G06F 40/30* | (2020.01) |
| *G06F 40/40* | (2020.01) |
| *G06F 40/42* | (2020.01) |
| *G06F 40/137* | (2020.01) |
| *G06F 40/221* | (2020.01) |
| *G06F 3/0482* | (2013.01) |

(52) U.S. Cl.
CPC ...... *G06F 16/24532* (2019.01); *G06F 16/285* (2019.01); *G06F 16/288* (2019.01); *G06F 16/3329* (2019.01); *G06F 16/35* (2019.01); *G06F 16/367* (2019.01); *G06F 16/93* (2019.01); *G06F 16/951* (2019.01); *G06F 40/137* (2020.01); *G06F 40/221* (2020.01); *G06F 40/30* (2020.01); *G06F 40/40* (2020.01); *G06F 40/42* (2020.01); *G06N 20/00* (2019.01); *G06Q 50/01* (2013.01)

(58) Field of Classification Search
CPC ........ G06F 16/35; G06F 16/93; G06F 16/243; G06F 16/285; G06F 16/288; G06F 16/367; G06F 16/951; G06F 16/3329; G06F 16/24532; G06F 3/0482; G06N 20/00; G06Q 50/01
See application file for complete search history.

(56) References Cited

U.S. PATENT DOCUMENTS

| | | | |
|---|---|---|---|
| 2012/0303559 A1* | 11/2012 | Dolan | G06N 20/00 706/12 |
| 2013/0103623 A1* | 4/2013 | Burstein | G06N 5/022 706/12 |
| 2014/0280238 A1* | 9/2014 | Cormack | G06F 16/285 707/749 |
| 2016/0019282 A1 | 1/2016 | Lewis et al. | |
| 2016/0147399 A1 | 5/2016 | Berajawala et al. | |

* cited by examiner

Annotate

Reddit_Comments_Crowdflower022015

Reddit Comment data from 125 subreddits for crowdflower ayy lmao and scary movie was like a great horror movie, but with the comedy aspect. So is it a comedy or horror or both?

210

Document Labels for Genre

What is the best label for this document? (Check all that apply)

- Action — 220
- Comedy — 230
- Horror — 240
- Mystery — 250

NEXT DOCUMENT →

Example of per-label (Sentiment) confidence

| Document | Positive Confidence | Neutral Confidence | Negative Confidence |
|---|---|---|---|
| Idibon's NLP is great!!! | 0.77 | 0.23 | 0.41 |
| 610 | 620 | 630 | 640 |

FIG. 6

OPTIMIZATION TECHNIQUES FOR ARTIFICIAL INTELLIGENCE

CROSS REFERENCE TO RELATED APPLICATIONS

This application is a continuation of U.S. patent application Ser. No. 16/198,453, filed Nov. 21, 2018, titled "OPTIMIZATION TECHNIQUES FOR ARTIFICIAL INTELLIGENCE," which is a continuation of U.S. patent application Ser. No. 14/964,520, filed Dec. 9, 2015, titled "OPTIMIZATION TECHNIQUES FOR ARTIFICIAL INTELLIGENCE," which claims the benefits of U.S. Provisional Application 62/089,736, filed Dec. 9, 2014, and titled, "METHODS AND SYSTEMS FOR ANNOTATING NATURAL LANGUAGE PROCESSING," U.S. Provisional Application 62/089,742, filed Dec. 9, 2014, and titled, "METHODS AND SYSTEMS FOR IMPROVING MACHINE PERFORMANCE IN NATURAL LANGUAGE PROCESSING," U.S. Provisional Application 62/089,745, filed Dec. 9, 2014, and titled, "METHODS AND SYSTEMS FOR IMPROVING FUNCTIONALITY IN NATURAL LANGUAGE PROCESSING," and U.S. Provisional Application 62/089,747, filed Dec. 9, 2014, and titled, "METHODS AND SYSTEMS FOR SUPPORTING NATURAL LANGUAGE PROCESSING," the disclosures of which are hereby incorporated herein in their entireties and for all purposes.

This application is also related to U.S. non provisional application Ser. No. 14/964,517, filed Dec. 9, 2015, titled "METHODS FOR GENERATING NATURAL LANGUAGE PROCESSING MODELS," Ser. No. 14/964,518, filed Dec. 9, 2015, titled "ARCHITECTURES FOR NATURAL LANGUAGE PROCESSING," Ser. No. 14/964,522, filed Dec. 9, 2015, titled "GRAPHICAL SYSTEMS AND METHODS FOR HUMAN-IN-THE-LOOP MACHINE INTELLIGENCE," Ser. No. 14/964,510, filed Dec. 9, 2015, titled "METHODS AND SYSTEMS FOR IMPROVING MACHINE LEARNING PERFORMANCE," Ser. No. 14/964,511, filed Dec. 9, 2015, titled "METHODS AND SYSTEMS FOR MODELING COMPLEX TAXONOMIES WITH NATURAL LANGUAGE UNDERSTANDING," Ser. No. 14/964,512, filed Dec. 9, 2015, titled "AN INTELLIGENT SYSTEM THAT DYNAMICALLY IMPROVES ITS KNOWLEDGE AND CODE-BASE FOR NATURAL LANGUAGE UNDERSTANDING," Ser. No. 14/964,525, filed Dec. 9, 2015 titled "METHODS AND SYSTEMS FOR LANGUAGE-AGNOSTIC MACHINE LEARNING IN NATURAL LANGUAGE PROCESSING USING FEATURE EXTRACTION," Ser. No. 14/964,526, filed Dec. 9, 2015, titled "METHODS AND SYSTEMS FOR PROVIDING UNIVERSAL PORTABILITY IN MACHINE LEARNING," and Ser. No. 14/964,528, filed Dec. 9, 2015 titled "TECHNIQUES FOR COMBINING HUMAN AND MACHINE LEARNING IN NATURAL LANGUAGE PROCESSING," each of which are filed concurrently herewith, and the entire contents and substance of all of which are hereby incorporated in total by reference in their entireties and for all purposes.

TECHNICAL FIELD

The subject matter disclosed herein generally relates to processing data. In some example embodiments, the present disclosures relate to intelligent queuing techniques for natural language model generation.

BACKGROUND

There is a need for assisting customers or users to accurately and expediently process human communications brought upon by the capabilities of the digital age. The modes of human communications brought upon by digital technologies have created a deluge of information that can be difficult for human readers to handle alone. Companies and research groups may want to determine trends in the human communications to determine what people generally care about for any particular topic, whether it be what car features are being most expressed on Twitter®, what political topics are being most expressed on Facebook®, what people are saying about the customer's latest product in their customer feedback page, and so forth. It may be desirable for companies to aggregate and then synthesize the thousands or even millions of human communications from the many different modes available in the digital age (e.g., Twitter®, blogs, email, etc.). Processing all this information by humans alone can be overwhelming and cost-inefficient. Methods today may therefore rely on computers to apply natural language processing in order to interpret the many human communications available in order to analyze, group, and ultimately categorize the many human communications into digestible patterns of communication.

While natural language processing techniques have been applied to try to process human communications, some methods are less efficient than others in that more time may be needed to develop models or techniques catered to a client's specific needs. Conventional methodologies for providing natural language processing to clients may take months to complete, for example. Therefore, it is desirable to improve methodologies for generating natural language models.

BRIEF SUMMARY

A method for generating a natural language model comprises: selecting by one or more processors in a natural language platform, from a pool of documents, a first set of documents to be annotated; for each document in the first set of documents, generating, by the one or more processors, a first human readable prompt configured to elicit an annotation of said document; receiving annotations of the first set of documents elicited by the first human readable prompts; training, by the one or more processors, a natural language model using the annotated first set of documents; determining, by the one or more processors, documents in the pool having uncertain natural language processing results according to the trained natural language model and/or the received annotations; selecting by the one or more processors, from the pool of documents, a second set of documents to be annotated comprising one or more of the documents having uncertain natural language processing results; for each document in the second set of documents, generating, by the one or more processors, a second human readable prompt configured to elicit an annotation of said document; receiving annotations of the second set of documents elicited by the second human readable prompts; and retraining, by the one or more processors, a natural language model using the annotated second set of documents.

According to some example embodiments, the annotations of the first and second sets of documents comprise classification of the documents into one or more categories among a plurality of categories.

According to some example embodiments, the annotations of the first and second sets of documents comprise selection of one or more portions of the documents relevant to one or more topics.

According to some example embodiments, the steps of determining documents having uncertain natural language processing results; selecting a second set of documents to be annotated; generating a second human readable prompt; receiving annotations of the second set of documents; and retraining a natural language model using the annotated second set of documents, are repeated until the trained model has reached a predetermined performance level.

According to some example embodiments, selecting the first set of documents comprises selecting documents that are evenly distributed among different document types.

According to some example embodiments, selecting the first set of documents comprises selecting at least one document within each of a plurality of machine-discovered topics.

According to some example embodiments, selecting the first set of documents comprises selecting documents based on a keyword search.

According to some example embodiments, selecting the first set of documents comprises selecting documents based on confidence levels generated by analysis of the documents by one or more pre-existing natural language models.

According to some example embodiments, selecting the first set of documents comprises a manual selection.

According to some example embodiments, selecting the first set of documents comprises removing exact duplicates and/or near duplicates from the first set of documents.

According to some example embodiments, selecting the first set of documents comprises selecting documents based on features contained therein.

According to some example embodiments, determining documents having uncertain natural language processing results is based on confidence levels generated by analysis of the documents by the trained model.

According to some example embodiments, the method further comprises training, by the one or more processors, a plurality of additional natural language models using the annotated first set of documents, wherein determining documents having uncertain natural language processing results is based on a level of disagreement among the plurality of additional natural language models.

According to some example embodiments, the level of disagreement is determined by assigning more weight to models with better known performance levels than models with worse known performance levels.

According to some example embodiments, determining documents having uncertain natural language processing results is based on a level of disagreement among more than one annotator.

According to some example embodiments, the level of disagreement is determined by assigning more weight to annotators with better known performance levels than annotators with worse known performance levels.

According to some example embodiments, selecting the second set of documents comprises selecting documents similar to documents that have a high level of disagreement among more than one annotator.

According to some example embodiments, the second human readable prompt is configured to elicit a true-or-false answer aimed at resolving uncertainty in the natural language processing results.

An apparatus for generating a natural language model comprises one or more processors configured to: select, from a pool of documents, a first set of documents to be annotated; for each document in the first set of documents, generate, by the one or more processors, a first human readable prompt configured to elicit an annotation of said document; receive annotations of the first set of documents elicited by the first human readable prompts; train a natural language model using the annotated first set of documents; determine documents in the pool having uncertain natural language processing results according to the trained natural language model and/or the received annotations; select, from the pool of documents, a second set of documents to be annotated comprising one or more of the documents having uncertain natural language processing results; for each document in the second set of documents, generate, by the one or more processors, a second human readable prompt configured to elicit an annotation of said document; receive annotations of the second set of documents elicited by the second human readable prompts; and retrain a natural language model using the annotated second set of documents.

According to some example embodiments, the one or more processors are further configured to repeat determining documents having uncertain natural language processing results, selecting a second set of documents to be annotated; generating a second human readable prompt configured to receive annotations of the second set of documents; and retraining a natural language model using the annotated second set of documents, until the trained model has reached a predetermined performance level.

A non-transitory computer readable medium comprises instructions that, when executed by a processor, cause the processor to: select, from a pool of documents, a first set of documents to be annotated; for each document in the first set of documents, generate a first human readable prompt configured to receive annotations of the first set of documents; train a natural language model using the annotated first set of documents; determine documents in the pool having uncertain natural language processing results according to the trained natural language model and/or the received annotations; select, from the pool of documents, a second set of documents to be annotated comprising one or more of the documents having uncertain natural language processing results; for each document in the second set of documents, generate a second human readable prompt configured to receive annotations of the second set of documents; and retrain a natural language model using the annotated second set of documents.

BRIEF DESCRIPTION OF THE DRAWINGS

Some embodiments are illustrated by way of example and not limitation in the figures of the accompanying drawings.

FIG. 2 is a diagram illustrating an example of a classification task, according to some example embodiments.

FIG. 6 is a diagram illustrating an example of a confidence level, according to some example embodiments.

DETAILED DESCRIPTION

Figure 1:
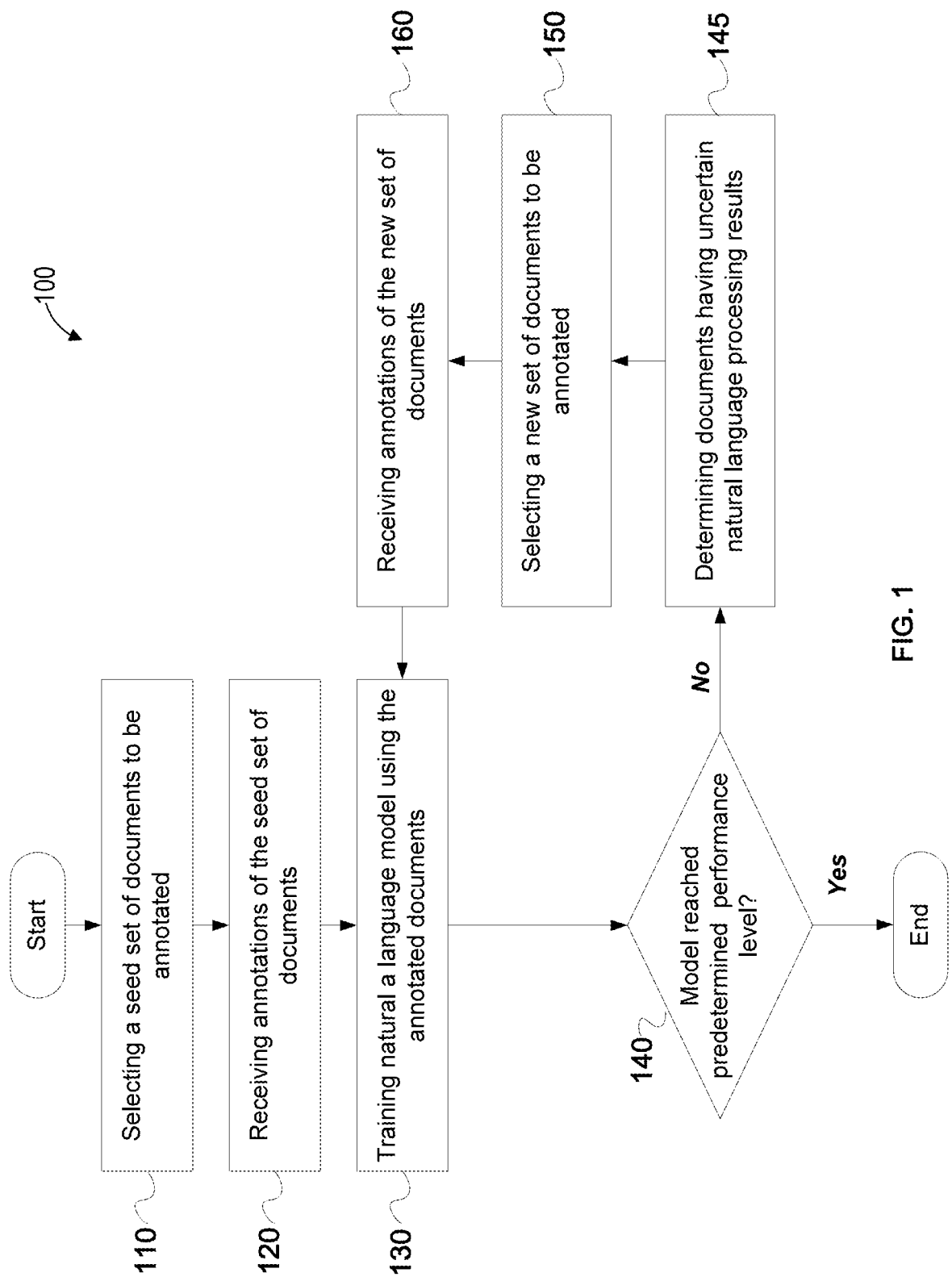
FIG. 1 is a flow chart illustrating an example method for generating a natural language model, according to some example embodiments.

Example methods, apparatuses and computer readable medium are presented for providing intelligent queuing techniques during the process of generating a natural language model.

In natural language processing, machine learning techniques are often applied. Human annotations help the machine learning techniques resolve inevitable ambiguities in the human communications, as well as provide intelligence or meaning to communications that the machine does not accurately comprehend. The human annotations can then enable computers to provide better natural language processing results of the human communications.

One of the problems with existing natural language machine learning techniques is selection of samples to be annotated by a human. Generally, when more human communications samples are annotated by humans, the results of natural language processing tend to be more accurate. However, human annotation is time-consuming and expensive. Thus, there is a need for a method that selects a relatively small number of samples to be annotated by humans while still effectively providing annotations that sufficiently aide the machine learning techniques. The selected samples provide substantial benefit to the machine learning process, so that the accuracy of natural language processing can be improved with a small amount of human annotation.

Another problem with existing natural language machine learning techniques is combining annotations from different human annotators. Human annotations are not perfect. Various factors, such as the experience of human annotators and the quality of questions that the human annotators are asked to answer, have impact on the accuracy of human annotations. Thus, there is a need to have multiple human annotators annotate a same sample, and combine these annotations to assist the machine learning process, so that the impact of the inaccuracy of individual annotators can be reduced.

Examples merely demonstrate possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

I. Intelligent Queuing

Aspects of the present disclosure are presented to select a relatively small number of samples to be annotated by human while still effectively providing annotations that sufficiently aide the machine learning techniques. The selected samples provide substantial benefit to the machine learning process, so that the accuracy of natural language processing can be improved with a small amount of human annotation. These aspects of the present disclosure are sometimes referred to as "Intelligent Queuing."

a. General Description of Intelligent Queuing

FIGS. 1-4 provide a high level description of intelligent queuing, including example interfaces for interacting with a user in the intelligent queuing process, according to some embodiments.

Referring to FIG. 1, a flow chart illustrating an example method 100 for generating a natural language model is shown, according to some example embodiments. The example method 100 begins at step 110 with selecting a seed set of documents to be annotated. Step 110 may be conducted by one or more processors in a natural language platform. The seed set of documents is selected from a pool of documents to be processed by natural language processing. A document is a single unit of text to be processed by natural language processing. A document, for example, may be a Tweet, a Facebook® status update, a blog, an email, an online comment, a transcribed phone conversation, etc. According to some example embodiments, the seed set of documents may contain one document or more than one document.

The example method 100 then continues at step 120 to receiving annotations of the seed set of documents. Step 120 may be facilitated by generating for each document in the seed set of documents, a first human readable prompt configured to elicit an annotation of said document, and receiving annotations of the seed set of documents elicited by the first human readable prompts. The human readable prompts may be generated by the one or more processors in the natural language platform. The human readable prompts may be, for example, in the form of graphic user interface ("GUI"). The human readable prompts may be generated locally or remotely.

According to some example embodiments, the annotations of the seed set of documents may comprise classification of the documents into one or more categories among a plurality of categories. This type of annotations is sometimes referred to as a "classification task" or a "document-scope task." The categories are sometimes referred to as "labels." An example of a classification task is sentiment analysis, where the annotations classify documents into sentiments such as the labels "positive" and "negative." The sentiments may also include other labels, such as "very positive," "very negative," "neutral," etc. Another example of a classification task is genre analysis, where the annotations classify documents into genres such as "mystery," "suspense," "romance," "science fiction," and "fantasy." According to some example embodiments, the categories may be arranged in a hierarchy referred to as an "ontology."

According to some example embodiments, the annotations of the seed set of documents may comprise selection of one or more portions of the documents relevant to one or more topics. This type of annotation is sometimes referred to as an "extraction task" or a "span-scope task." The one or more topics are sometimes referred to as "labels." An example of an extraction task is named entity recognition, where the annotations identify portions of documents relevant to a person, a company and/or a location. Another example of an extraction task is part-of-speech tagging, where the annotations identify portions of documents that are noun phrases and/or verb phrases.

According to some example embodiments, the annotations may be manual annotations supplied by human analysts and/or crowd-sourced workers. The annotations may also be supplied by machines.

The example method 100 then continues at step 130 to training a natural language model using the annotated documents. Step 130 may be conducted by the one or more processors in the natural language platform. When Step 130 is performed for the first time, the annotated seed set of documents is used to train the natural language model. Note that only a subset of all available annotated documents may be used. A natural language model is an artificial intelligence ("AI") model that is used to conduct natural language processing on the documents. Training is the machine learning process used to generate and/or improve a natural language model. More details about training are described in non-provisional application Ser. No. 14/964,517, filed Dec. 9, 2015, which is again incorporated by reference in its entirety.

The example method 100 then determines at step 140 whether the trained model has reached a predetermined performance level. Step 140 may be conducted by the one or more processors in the natural language platform. According to some example embodiments, the performance level of the trained model may be evaluated using a cross validation technique, a comparison to a held-out test set, or other techniques generally known in the art.

If the trained model has reached a predetermined performance level, the example method 100 ends. If the trained model has not reached a predetermined performance level, then additional optimization techniques may be performed to further refine the natural language model. Here, the example method 100 continues at step 145 to determining documents in the pool having uncertain natural language processing results. Step 145 may be conducted by the one or more processors in the natural language platform. The uncertainty of natural language processing results may be based on the trained natural language model and/or the received annotations. The degree of uncertainty may be measured by a number of different approaches, as described below in the detailed description of step 145. The documents thus determined are documents informative to the machine learning process.

The example method 100 continues from step 145 to step 150: selecting a new set of documents to be annotated. The new set of documents comprises documents having uncertain natural language processing results, or documents that, when annotated, are likely to reinforce or improve the accuracy of the natural language model. Step 150 may be conducted by the one or more processors in the natural language platform. This process is sometimes referred to as "queuing." According to some example embodiments, the new set of documents may contain one document or more than one document.

According to some example embodiments, selecting the new set of documents comprises selecting documents similar to documents that have already been selected in the second set of documents. This way, the machine learning process is reinforced by annotating even more documents having uncertain natural language processing results.

The example method 100 continues from step 150 to step 160: receiving annotations of the new set of documents. Step 160 may be facilitated by generating for each document in the new set of documents, a second human readable prompt configured to elicit an annotation of said document, and receiving annotations of the new set of documents elicited by the second human readable prompts. The human readable prompts may be generated by the one or more processors in the natural language platform. The human readable prompts may be, for example, displayable in a GUI. The human readable prompts may be generated locally or remotely.

According to some example embodiments, the second human readable prompt may be configured to elicit a true-or-false answer aimed at resolving uncertainty in the natural language processing results. For example, a true-or-false question may be asked when an annotator has already annotated a document, and the aggregation process (described in Section II) determines that independent verification of the annotator's selection is appropriate, because the annotator has low performance level (discussed below); when multiple annotators provide conflicting annotations for the document; when the natural language model confidently disagrees with an annotator; or when the natural language model has a low-or-medium level confidence about a prediction which has not been annotated previously. In extraction tasks, the second human readable prompt may be configured to elicit a true-or-false answer for partially-agreed-upon annotations (i.e., when two annotators select overlapping but unequal locations in the text).

According to some example embodiments, the annotations of the new set of documents may comprise classification of the documents into one or more categories among a plurality of categories. According to some example embodiments, the annotations of the new set of documents may comprise selection of one or more portions of the documents relevant to one or more topics.

The example method 100 continues from step 160 back to step 130: training the natural language model using the annotated documents. According to some example embodiments, the natural language model may be trained using all annotated documents that have been accumulated during the process, or any subset thereof. For example, the natural language model may be trained using only the annotated new set of documents. The iterative process continues until the model has reached the predetermined performance level.

According to some example embodiments, Step 140 may be omitted. In such a case, steps 145, 150 and 160 may be repeated until all the documents in the pool have been annotated, or may be repeated for a predetermined number of times. The predetermined number of times may be 1.

Referring to FIG. 2, a diagram illustrating an example 200 of a classification task is shown, according to some example embodiments. In the example 200, the annotator is annotating an online comment shown in box 210. The annotator classifies the online comment into one or more of four categories (labels). Here the categories are genres "Action" 220, "Comedy" 230, "Horror" 240 and "Mystery" 250.

Figure 3:
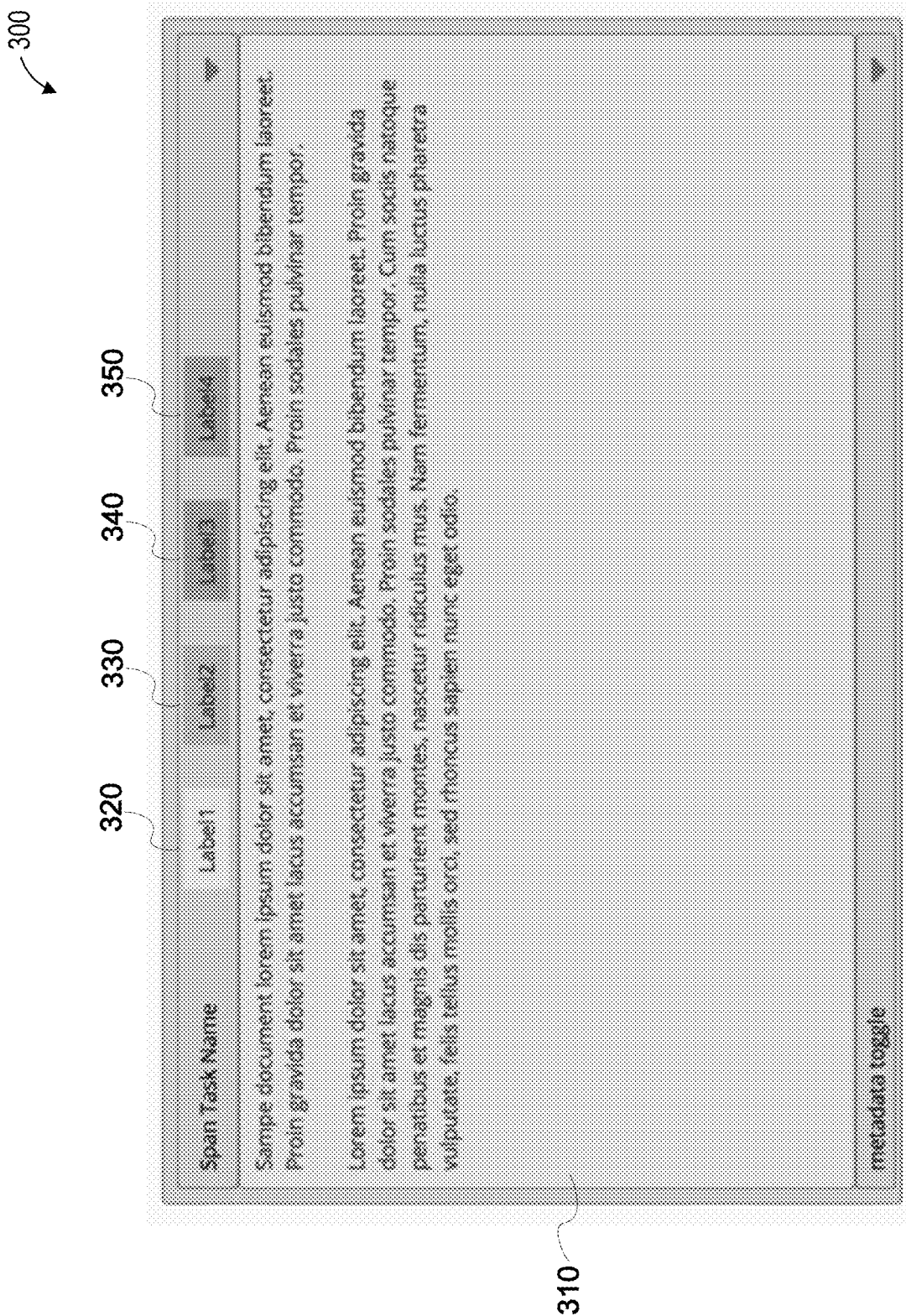
FIG. 3 is a diagram illustrating an example of an extraction task, according to some example embodiments.

Referring to FIG. 3, a diagram illustrating an example 300 of an extraction task is shown, according to some example embodiments. In the example 300, the annotator selects one or more portions of the text in box 310 and marks the portions as one or more of four topics (labels) 320, 330, 340 and 350.

Figure 4:
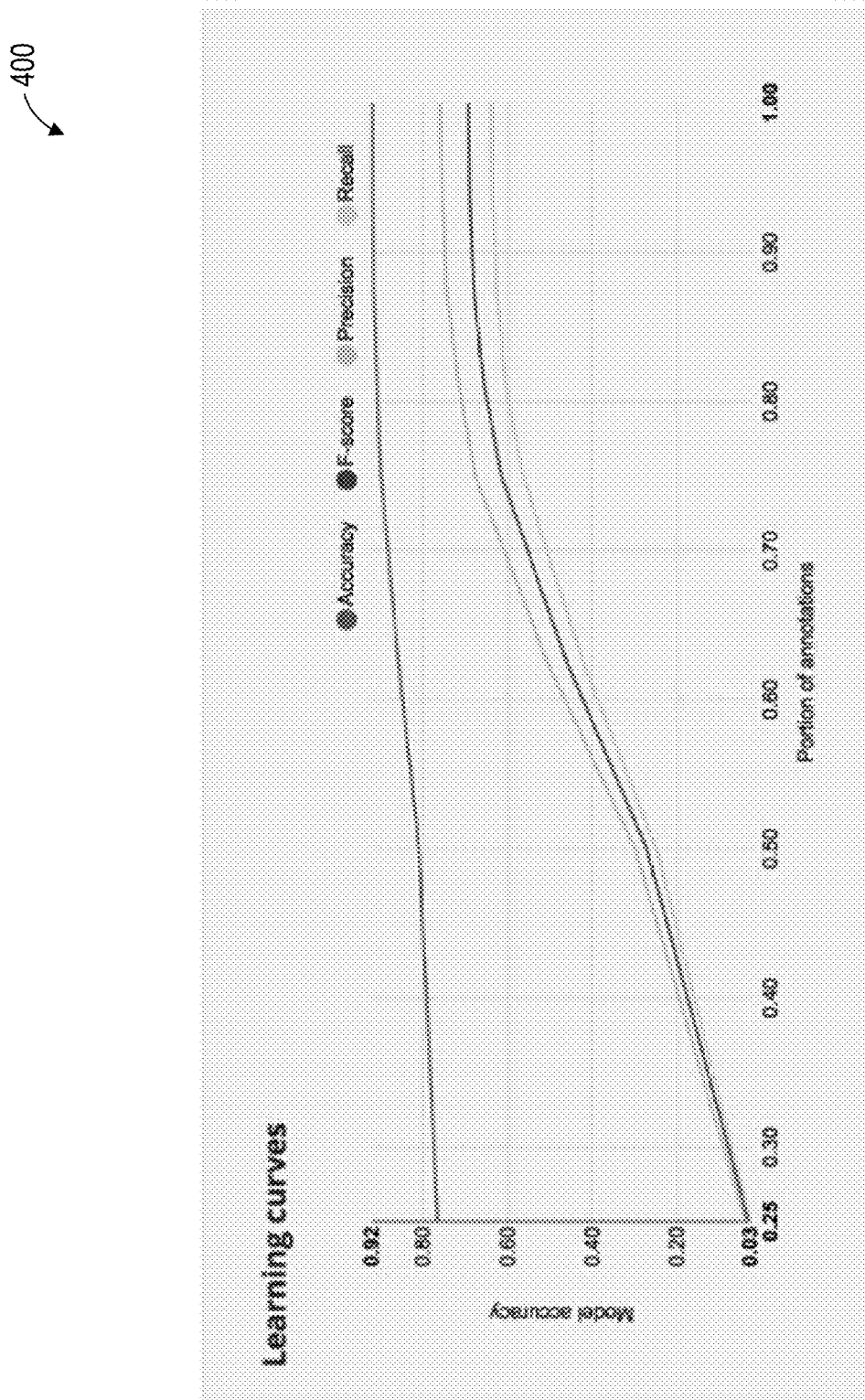
FIG. 4 is a diagram illustrating an example of evaluating the performance level of a trained model using cross validation, according to some example embodiments.

Referring to FIG. 4, a diagram illustrating an example 400 of evaluating the performance level of a trained model using cross validation is shown, according to some example embodiments. Cross validation is a technique used to measure the performance of a predictive model. For example, in a 10-fold cross validation, all the annotated documents are divided into 10 subsets with equal size. Each time, 9 of the subsets are used to train a "test" natural language model, the trained "test" model conducts an analysis of the documents in the remaining 1 subset, and the result of the analysis is compared to the annotations of the remaining 1 subset. The process is repeated until every combination of 9 subsets has been used to train a "test" model. The results of the comparisons are represented by several parameters: accuracy, precision, recall, and F-score. The higher these parameters are, the better the performance of the original model is, since the "test" models were generated using the same machine learning process and with a subset of the same annotated documents. Thus, the predetermined performance level may be defined as threshold value(s) of one or more of these parameters. As shown in example 400, as the number of annotated documents increases (because of the iterative process in the example method 100), the performance level increases.

b. Further Example Details for Selection of the Seed Set of Documents

Now, step 110 in the example method 100 of selecting a seed set of documents to be annotated is described with further details below. The seed set of documents is usually selected when there is no trained model available. To speed up the machine learning process, the seed set of documents is selected with the goal of exposing the machine learning process to as many different types of documents as possible. In other words, the diversity of the documents should be reflected in the seed set of documents. Thus, according to some example embodiments, the seed set of documents may be selected such that they are evenly distributed among different document types. According to some example embodiments, exact duplicates and/or near duplicates may be removed from the seed set of documents.

According to some example embodiments, selecting the seed set of documents may be unsupervised. Unsupervised machine learning techniques such as topic modeling may be used. Topic modeling is used to machine-discover topics within a pool of documents.

Figure 5:
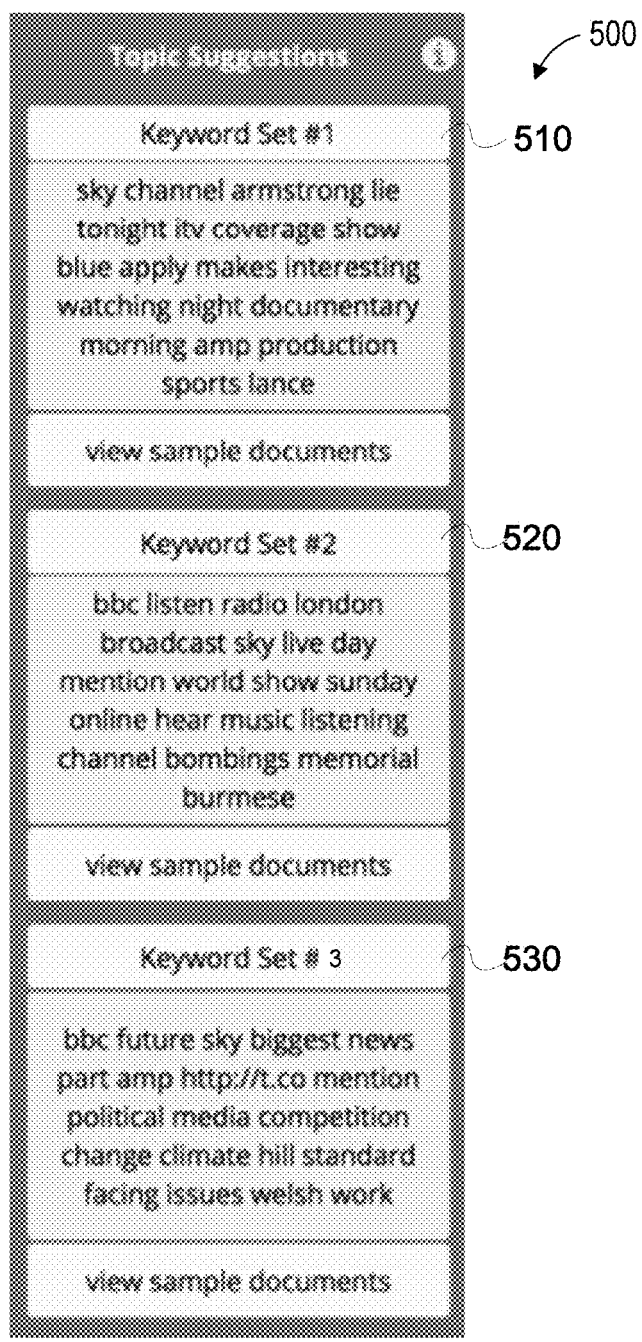
FIG. 5 is a diagram illustrating an example of topic modeling, according to some example embodiments.

Referring to FIG. 5, a diagram illustrating an example 500 of topic modeling is shown, according to some example embodiments. Topic modeling discovers a number of common themes (topics) represented by a list of key words, and groups documents into these topics. As shown in example 500, three topics 510, 520 and 530 have been discovered, each with a list of key words and a list of documents that can be viewed. More details about topic modeling are described in non-provisional application Ser. No. 14/964,517, filed Dec. 9, 2015 which is again incorporated by reference in its entirety.

According to some example embodiments, the seed set of documents may be selected such that at least one document is selected within each machine-discovered topic. Thus the machine learning process is exposed to all of the topics discovered by topic modeling. According to some example embodiments, selecting at least one document within each machine-discovered topic may be based on well-known sampling techniques such as stratified sampling.

According to some example embodiments, the topic modeling algorithm may generate hierarchical relationships among the topics (referred to as hierarchical clustering).

According to some example embodiments, the seed set of documents may be selected based on a keyword search. For example, a first group of search results is generated by searching keywords related to a first document type, and a second group of search results is generated by searching keywords related to a second document type. At least one document within the first group and at least one document within the second group are selected. According to some example embodiments, the search may be conducted on metadata of the documents.

According to some example embodiments, the seed set of documents may be selected based on confidence levels generated by analysis of the documents by one or more existing natural language models. The one or more existing natural language models may be, for example, off-the-shelf natural language models such as Idibon® public models that can be used for sentiment analysis on English language documents.

Referring to FIG. 6, a diagram illustrating an example 600 of a confidence level is shown, according to some example embodiments. As shown in example 600, text of document 610 "Idibon's NLP is great!! !" is analyzed by a natural language model. The natural language model outputs a confidence level for each of the possible categories (labels) "positive" 620, "neutral" 630, and "negative" 640. A confidence level is a measure of how confidently the model classifies the document into a category (label). As shown in example 600, "positive" 620 has the highest confidence level 0.77.

A document may be selected for the seed set of documents when, for example, none of the confidence levels for the categories (labels) are high enough. Example confidence levels would be as follows: "positive": 0.6, "neutral": 0.4, and "negative": 0.3. A document may be excluded from the seed set of documents when, for example, the confidence level for one category (label) is sufficiently high. Example confidence levels would be as follows: "positive": 0.8, "neutral": 0.2, and "negative": 0.1. This way, the documents having the most uncertain natural language processing results according to the existing models (cause the most confusion) are selected for human annotation.

According to some example embodiments, the seed set of documents may be selected manually. Experts or project managers that have expertise in processing a specific type of documents may conduct the initial selection manually.

According to some example embodiments, the seed set of documents may be selected based on random sampling. The size of the seed set may vary depending on the desired confidence level and confidence interval.

According to some example embodiments, the seed set of documents may be selected based on stratified random sampling. The strata may be determined based on a variety of factors including intervals/categories in metadata fields (e.g. time of post, author), or document clusters as determined by metadata similarity, text similarity, document lengths, etc.

According to some example embodiments, the seed set of documents may be selected based on document ordering, e.g., the first N documents may be selected.

c. Further Example Details for Selection of the New Set of Documents

Now, step 145 in the example method 100 of determining documents having uncertain natural language processing results is described with further details below.

According to some example embodiments, determining documents having uncertain natural language processing results may be based on a confidence level generated by analysis of the documents by the trained model. In a way similar to the above description with reference to FIG. 6, the trained model analyzes the documents in the pool and outputs confidence levels for the documents. A document may be determined as having uncertain natural language processing results when, for example, none of the confidence levels for the categories (labels) are high enough. A document may be determined as not having uncertain natural language processing results when, for example, the confidence level for one category (label) is sufficiently high. This way, the documents having the most uncertain natural language processing results according to the trained model (cause the most confusion) are selected for a new round of human annotation.

According to some example embodiments, determining documents having uncertain natural language processing results may be based on a level of disagreement among more than one annotator. More than one annotator may provide annotations for the same document, and their annotations might disagree with each other.

Figure 7:
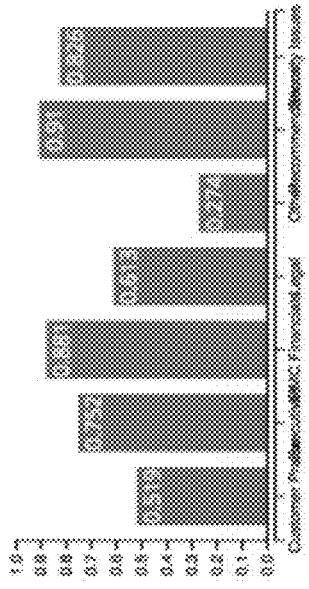
FIG. 7 is a diagram illustrating an example of a level of disagreement, according to some example embodiments.

Referring to FIG. 7, a diagram illustrating an example 700 of a level of disagreement is shown, according to some example embodiments. As shown in example 700, after many (e.g., hundreds) of documents are annotated, a disagreement level (in other words, agreement level) 702 is generated for each category (label). For each category (label), documents with the most agreement and with the least agreement are identified. In example 700, documents with the most agreement and with the least agreement for the category (label) "Other" are shown. The agreement level for a document with respect to a label is determined based on the equation: abs(2*[#annotators that select the label]/[#annotators]−1). Thus, documents with the smallest absolute value have the least agreement and documents with the largest absolute value have the most agreement. Note that large negative values represent strong agreement that the document is not the label. For example, if 3 out of 4 annotators select a label for that document, the agreement level will be 0.5.

Therefore, for each category (label), a number of documents with the least agreement may be determined as having uncertain natural language processing results. According to some example embodiments, the documents having the most uncertain natural language processing results according to the received annotations (cause the most confusion) can be used to identify similar documents that are also likely to have uncertain natural language processing results. These similar documents can be selected for a new round of human annotation. Document similarity can be calculated automatically based on text or metadata similarity. In other words, selecting the second set of documents comprises selecting documents similar to documents that have a high level of disagreement among more than one annotator According to some example embodiments, the level of disagreement is determined by assigning more weight to annotators with better known performance levels. A performance level for each annotator may be generated based on past experience with this annotator.

Figure 8:
FIG. 8 is a diagram illustrating an example of an annotator performance level, according to some example embodiments.

Referring to FIG. 8, a diagram illustrating an example 800 of an annotator performance level is shown, according to some example embodiments. As shown in example 800, the performance levels of four annotators 810, 820, 830 and 840 are evaluated based on their agreement with other annotators (referred to as Inter-Annotator Agreement or IAA) on the right column. The IAA scores may be calculated based on the Krippendorff's alpha method generally known in the art.

According to some example embodiments, one or more additional natural language models may be trained at step 130, and determining documents having uncertain natural language processing results may be based on a level of disagreement among multiple trained models. Multiple natural language models may be trained, for example, by training using different subsets of the annotated documents. Multiple natural language models may also be trained, for example, by applying the same annotated set of documents to different base models.

The level of disagreement may be determined in a way similar to the description with reference to FIG. 7. For each category (label), a number of documents with the least agreement may be determined as having uncertain natural language processing results. This way, the documents having the most uncertain natural language processing results (cause the most confusion) are selected for a new round of human annotation.

According to some example embodiments, the level of disagreement is determined by assigning more weight to models with better known performance levels. The performance level of a model may be determined in a way similar to the description with reference to FIG. 4.

According to some example embodiments, the seed set or the new set of documents may be selected based on features contained in the documents. For example, after the performance of feature extraction and feature selection (described in more details in non-provisional application Ser. No. 14/964,525, filed Dec. 9, 2015 which is again incorporated by reference in its entirety), statistics are generated across the entire document pool, including the frequencies of occurrence of each feature within the document pool. The statistics may be measured by TF-IDF, which is generally known in the art as a way of measuring how important individual words are to a pool of documents. Such statistics may be stored in a table associating each feature with the calculated statistics. In intelligent queuing, these statistics may be used to select one or more documents from the document pool for human annotation. For example, intelligent queuing may select documents containing rare features (contained in few other documents or contained only in documents that have not been annotated), to improve the natural language model's understanding of such features.

According to some example embodiments, the new set of documents may be selected based on a confusion matrix. For example, documents similar to those documents that were determined to be misclassified by the natural language model may be selected for queuing.

An apparatus for generating a natural language model may comprise one or more processors configured to perform the steps described above.

A non-transitory computer readable medium may comprise instructions that, when executed by a processor, cause the processor to perform the steps described above.

II. Annotation Aggregation

Aspects of the present disclosure are presented to have multiple human annotators annotate a same sample, and combine these annotations to assist the machine learning process, so that the impact of the inaccuracy of individual annotators can be reduced. In addition, combining the annotations may determine whether there is sufficient agreement about the document for it to be used in the machine learning process for training the natural language model. These aspects of the present disclosure are sometimes referred to as "Annotation Aggregation."

Figure 9:
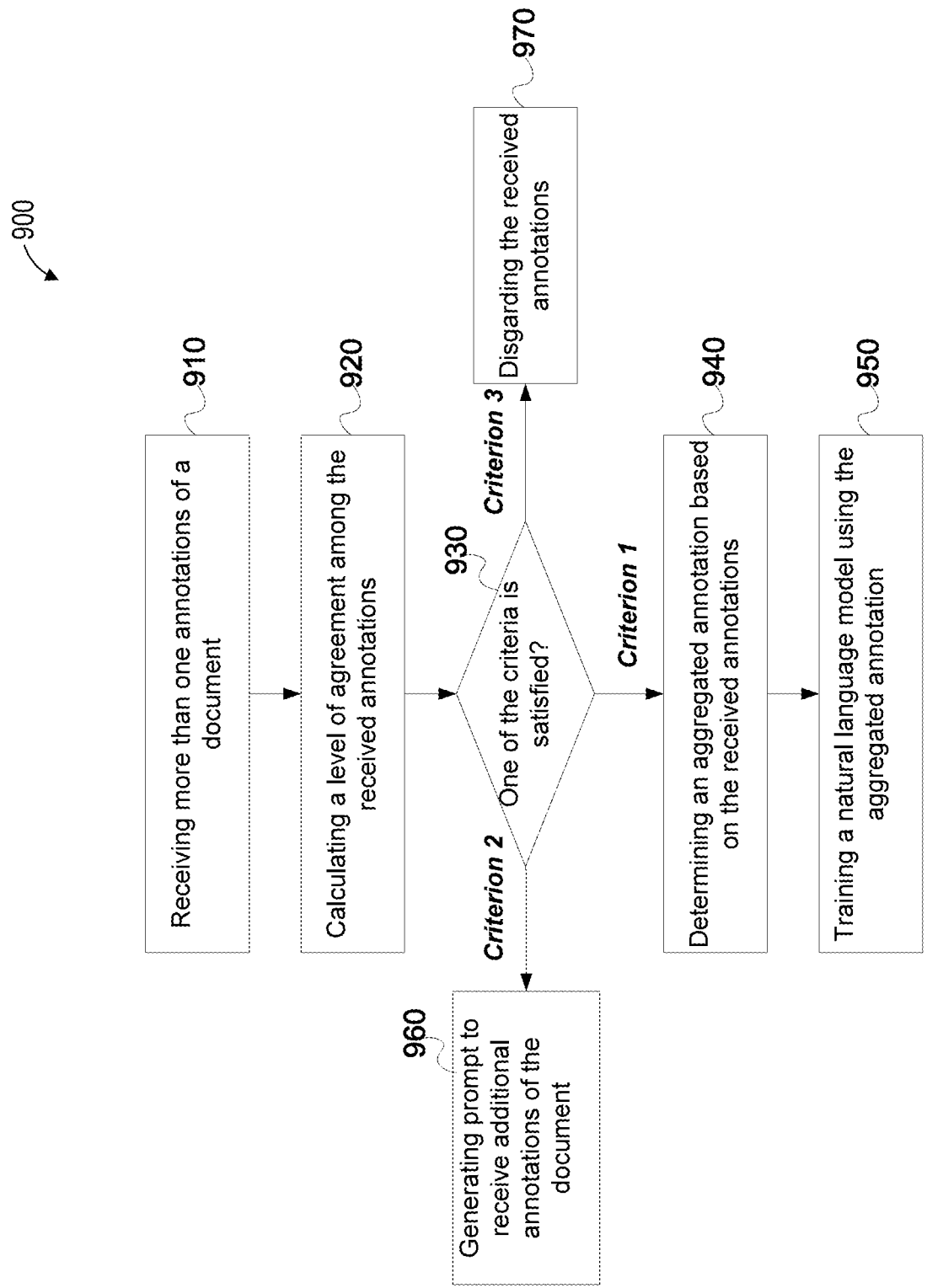
FIG. 9 is a flow chart illustrating an example method for generating a natural language model, according to some example embodiments.

Referring to FIG. 9, a flow chart illustrating an example method 900 for generating a natural language model is shown, according to some example embodiments. The example method 900 begins with receiving, at step 910, more than one annotation of a document. The concepts of "annotations" and "document" are similar to those described with respect to Intelligent Queuing in Section I. The annotations of the document may comprise selection of one or more portions of the document relevant to one or more topics (extraction tasks), or comprise selection of one or more categories among a plurality of categories (classification tasks). The more than one annotation may be provided by multiple annotators, or may be provided by a single annotator at different times.

The example method 900 then continues to calculating, at step 920, a level of agreement among the received annotations. The more than one annotation of a same document might disagree with each other. The level of agreement measures the degree of agreement or disagreement among these annotations.

The example method 900 then continues at step 930 to determining whether one of Criterion 1, Criterion 2 and Criterion 3 is satisfied. The determination may be based at least in part on the level of agreement.

If Criterion 1 is satisfied, the example method 900 continues to determining, at step 940, an aggregated annotation based on the received annotations, and then to training 950 a natural language model using the aggregated annotation. The concepts of "training" and "natural language model" are similar to those described with respect to Intelligent Queuing in Section I.

If Criterion 2 is satisfied, the example method 900 continues to generating, at step 960, at least one human readable prompt configured to receive additional annotations of the document. The human readable prompts may be, for example, in a form displayable in a GUI. The human readable prompts may be generated locally or remotely. According to some example embodiments, Criterion 2 is satisfied when the number of annotations received is less than a minimum number. Thus, aggregated annotation is not generated until a minimum number of annotations are received.

If Criterion 3 is satisfied, the example method 900 continues to discarding, at step 970, the received annotations. The discarded annotations will not be used for training natural language models. Criterion 3 may be satisfied when it is determined that there is too much disagreement among the annotations about the document, and that either additional annotations will not resolve the disagreement or it is not worth the time spent trying to resolve the disagreement.

Figure 10:
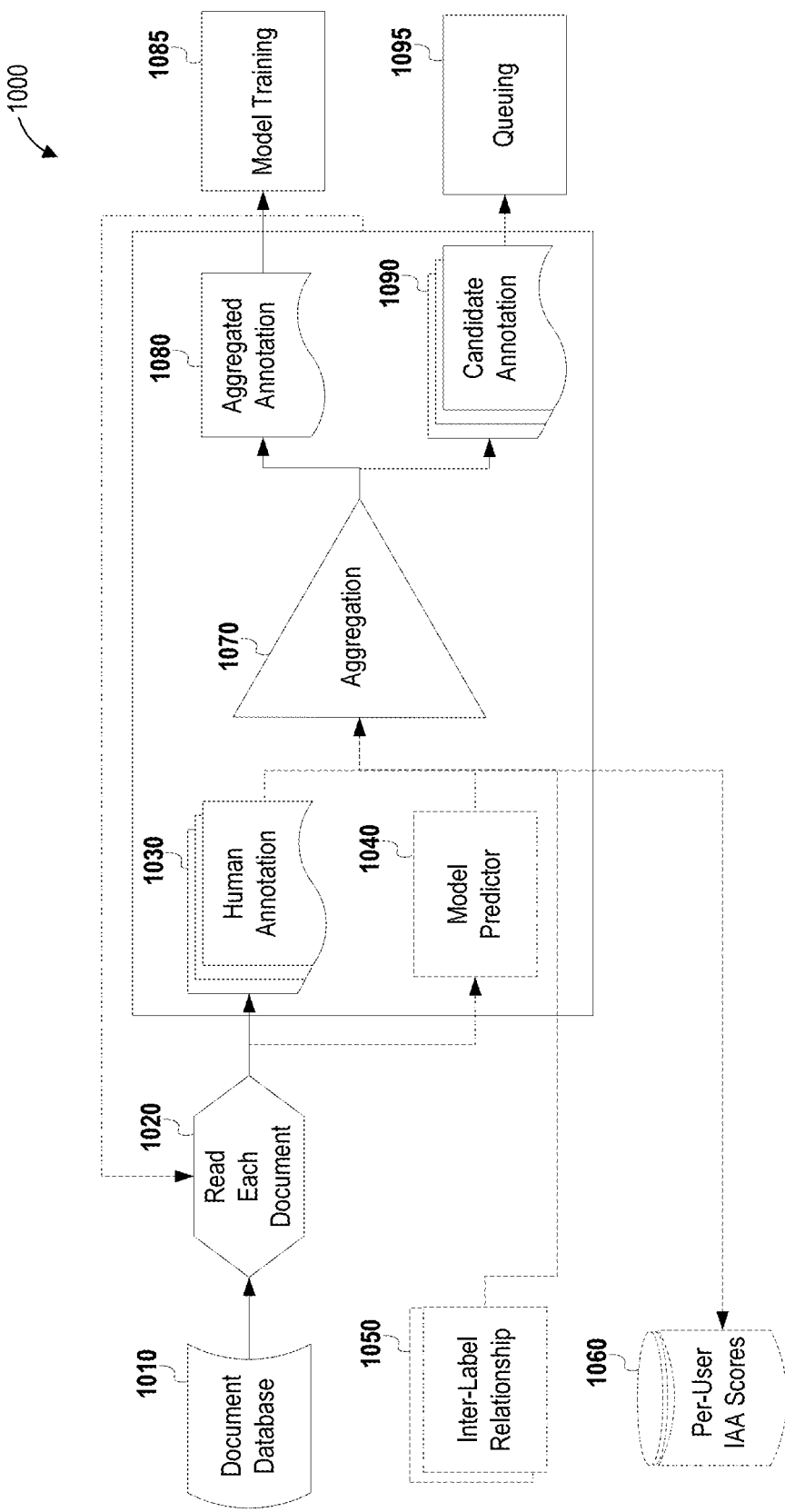
FIG. 10 is a flow chart illustrating high level concepts of annotation aggregation, according to some example embodiments.

Referring to FIG. 10, a flow chart 1000 illustrating high level concepts of annotation aggregation is shown, according to some example embodiments. At 1020, a document is read from document database 1010. Human annotations 1030 of the document are received and supplied to aggregation process 1070.

Optionally, model prediction 1040, inter-label relationships 1050 and per-user inter-annotator agreement ("IAA") scores 1060 may also be supplied to aggregation process 1070.

Model prediction 1040 is a result of an analysis of the document by one or more existing natural language models. The one or more existing natural language models may be, for example, off-the-shelf natural language models such as Idibon® public models that can be used for sentiment analysis on English language. The result of the analysis, for example, may be confident levels described above with reference to FIG. 6. An example use of model prediction 1040 in aggregation process 1070 is to treat a model prediction as another "human annotation," or a "human annotation" with more weight or less weight.

Inter-label relationships 1050 are the relationships among a plurality of categories (labels). The relationships, for example, may be the relative ordering of the categories, e.g., "positive": 1st, "neutral": 2nd, and "negative": 3rd. The relationship may be represented by a numerical value assigned to each of the categories, e.g., "very positive": +3, "positive": +1 "neutral": 0, "negative": −1, and "very negative": −3.

Per-user IAA scores 1060 are measurements of known performance levels of the annotators. Per-user IAA scores 1060, for example, may be the IAA scores described above with reference to FIG. 8. An example use of IAA scores in aggregation process 1070 is to assign more weight to annotators with higher IAA scores. Alternatively, aggregation process 1070 may also receive an indication that an annotator is an expert in a particular area, whose annotation may be treated as conclusive.

In other words, aggregation process 1070 may be optionally based on the relationships among a plurality of categories, a result of an analysis of the document by one or more existing natural language models, and/or known performance levels of the annotators.

Aggregation process 1070 may output aggregated annotation 1080 which is then used for model training 1085, and may output candidate aggregations 1090 for queuing 1095, i.e., additional annotations.

Figure 11:
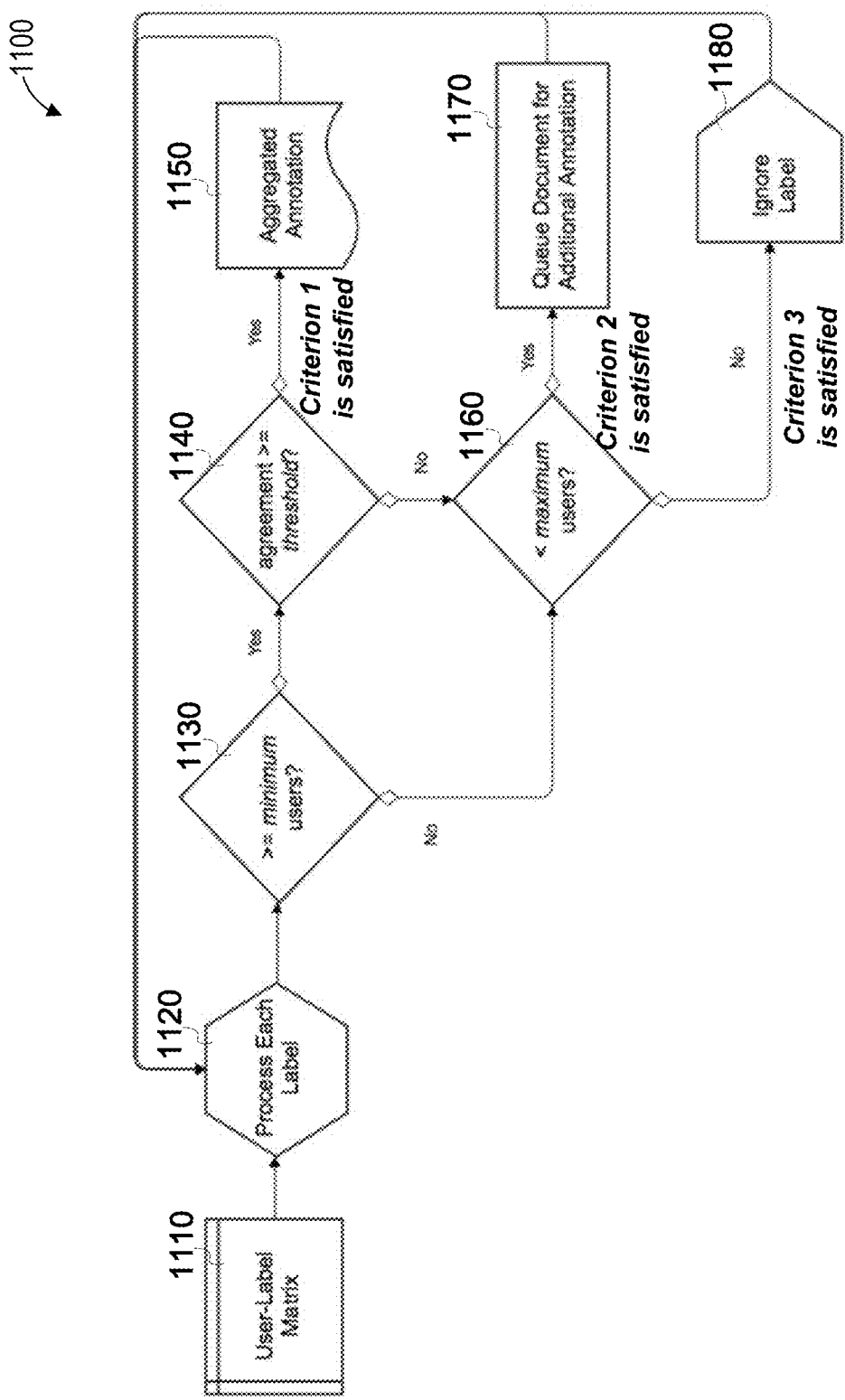
FIG. 11 is a flow chart illustrating an example method referred to as "Majority Vote," according to some example embodiments.

Referring to FIG. 11, a flow chart illustrating an example method 1100 referred to as a "Majority Vote" is shown, according to some example embodiments. The example method 1100 begins by supplying user-label matrix 1110 for processing. The user label matrix contains annotations by multiple annotators. An example of user-label matrix is shown below:

|  | Label | | |
| User | Sports | Entertainment | Politics |
| Bob | Y | N | N |
| Eve | N | Y | N |
| Alice | Y | N | N |

In the example above, for a particular document, annotators (users) "Bob" and "Alice" select category (label) "Sports," while annotator "Eve" selects category "Entertainment." No one selects category "Politics."

The example method 1100 continues to process, at step 1120, each category (label). According to some example embodiments, the level of agreement may be determined for each category based on a percentage of annotations that select said category.

For example, the level of agreement for a category may be determined as the percentage of annotations that select said category, or the percentage of annotations that do not select said category, whichever is greater. The agreement levels for the above example are shown below, the last line being the agreement levels:

|  | Label | | |
| User | Sports | Entertainment | Politics |
| Bob | Y | N | N |
| Eve | N | Y | N |
| Alice | Y | N | N |
| Aggregated (Agreement) | Y (0.6667) | N (0.6667) | N (1.0) |

In another example, the level of agreement for a category may be determined based on the following formula:

$$abs(2*(\#Y/(\#Y+\#N))-1)$$

where "#Y" is the number of annotators that select the category, and "#N" is the number of annotators that do not select the category. Based on the formula, the agreement levels in the above example are 0.3333 for "Sports," 0.3333 for "Entertainment," and 1 for "Politics."

The example method 1100 continues to determine, at step 1130, whether the number of annotators (users) is at least a minimum number, i.e., whether the number of annotations received is at least a minimum number. If so, the example method 1100 continues to step 1140. Otherwise the example method 1100 continues to step 1160.

At step 1140, the example method 1100 determines whether the agreement level is at least a threshold value. If so, the example method 1100 continues to step 1150 (Criterion 1 for this example is satisfied). Otherwise the example method continues to step 1160. Note that in example method 1100, the determination at step 1140 is conducted for each category (label) separately. In the example where the agreement level is the percentage of annotations that select said category, or the percentage of annotations that do not select said category, whichever is greater, the threshold value may be 0.5, so that the determination at step 1140 is essentially a majority vote. The threshold value may be above 0.5, so that a super-majority vote is necessary.

At step 1150, the example method 1100 determines an aggregated annotation to be used in training a natural language model. The aggregated annotation may be selecting the category, when the percentage of annotations that select the category is greater, or not selecting the category, when the percentage of annotations that do not select the category is greater.

At step 1160, the example method 1100 determines whether the number of annotators (users) is less than a maximum number. If so, the example method 1100 continues to step 1170 (Criterion 2 for this example is satisfied). Otherwise the example method continues to step 1180 (Criterion 3 for this example is satisfied).

At step 1170, the example method 1100 queues the document for additional annotation. At least one human readable prompt may be generated to receive additional annotations.

At step 1180, the label is ignored. In other words, the annotations for the label are discarded and are not used for model training.

After step 1150, 1170 or 1180, the example method 1100 continues back to step 1120 to process the next label.

When the above example user-label matrix is processed by the example method 1100, a result like the example result below is shown for three combinations of minimum number annotators, maximum number of annotators, and threshold agreement level:

| Label | Assignment | Agreement | minimum: 2 maximum: 3 threshold: 0.6 | minimum: 2 maximum: 3 threshold: 0.75 | minimum: 2 maximum: 3 threshold: 0.75 |
|---|---|---|---|---|---|
| Sports | Y | 0.6667 | TRAIN | IGNORE | QUEUE |
| Entertainment | N | 0.6667 | TRAIN | IGNORE | QUEUE |
| Politics | N | 1.0 | TRAIN | TRAIN | TRAIN |

As shown in the table, each combination (columns 4, 5 and 6) defines a set of Criteria 1, 2 and 3. Take column 4 as an example and use N and A to denote the number of annotations and the agreement level, respectively. Criterion 1 is N≥2 & A≥0.6. Criterion 2 is N<2, or 2≤N<3 & A<0.6, and Criterion 3 is N≥3 & A<0.6. When Criterion 1 is satisfied, the result is "TRAIN," i.e., an aggregated annotation is generated. When Criterion 2 is satisfied, the result is "QUEUE," i.e., additional annotations are requested. When Criterion 3 is satisfied, the result is "IGNORE," i.e., the annotations are discarded.

When the minimum number of annotators is 2, the maximum number of annotators is 3, and the threshold agreement level is 0.6, an aggregated annotation is generated for each of the three labels ("TRAIN").

When the minimum number of annotators is 2, the maximum number of annotators is 3, and the threshold agreement level is 0.75, annotations for "Sports" and "Entertainment" are discarded ("IGNORE"), and an aggregated annotation is generated for "Politics" ("TRAIN").

When the minimum number of annotators is 2, the maximum number of annotators is 4, and the threshold agreement level is 0.75, additional annotations for "Sports" and "Entertainment" are requested ("QUEUE"), and an aggregated annotation is generated for "Politics" ("TRAIN").

Figure 12:
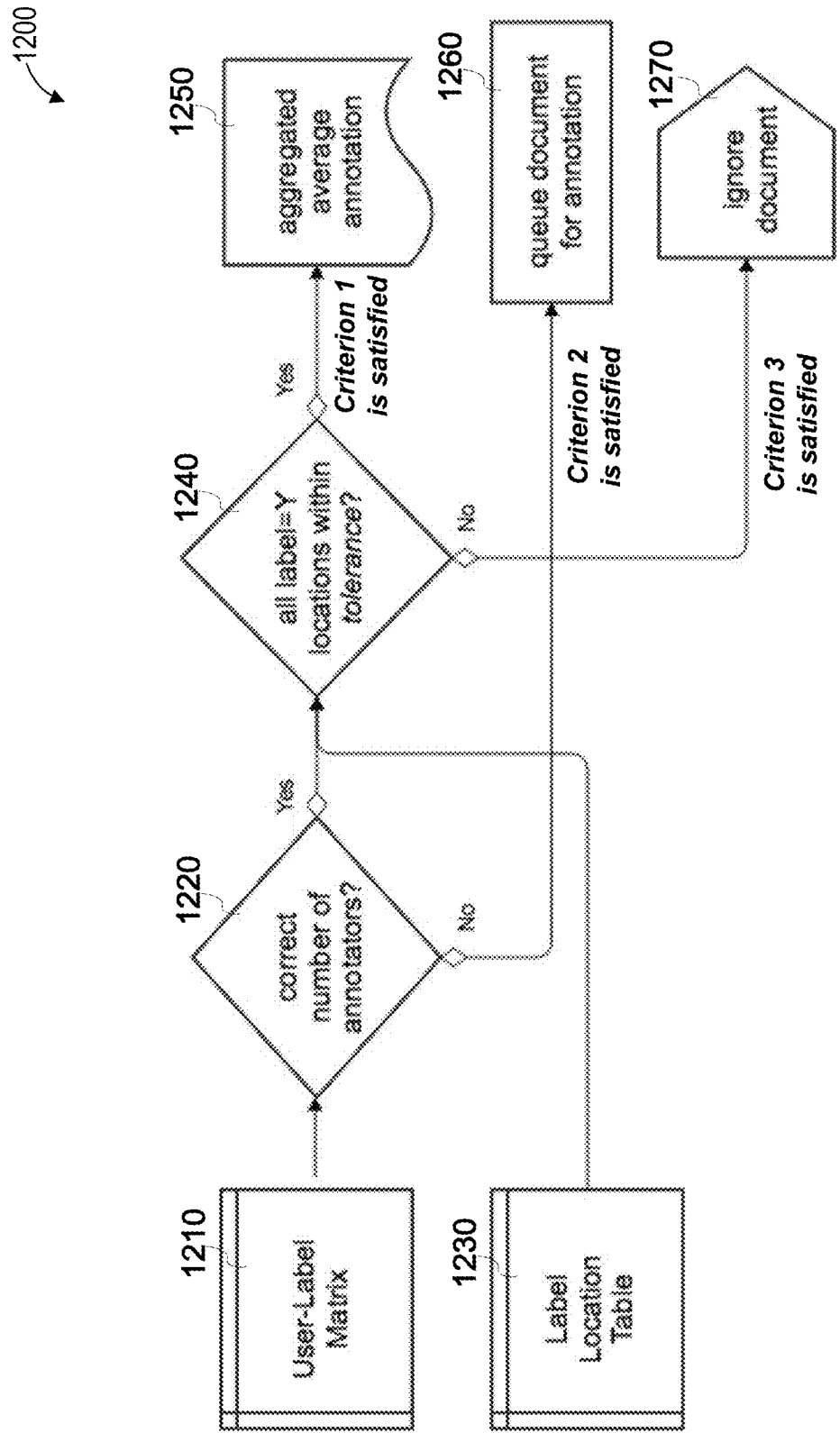
FIG. 12 is a flow chart illustrating an example method referred to as "Within Tolerance," according to some example embodiments.

Referring to FIG. 12, a flow chart illustrating an example method 1200 referred to as "Within Tolerance" is shown, according to some example embodiments.

As discussed above with reference to FIG. 10, inter-label relationships may be used in the aggregation processing. The relationships may be represented by a numerical value assigned to each of the categories, e.g., "very positive": +3, "positive": +1 "neutral": 0, "negative": −1, and "very negative": −3.

The example method 1200 begins by supplying user-label matrix 1210 for processing. The example method 1200 continues to determine 1220 whether the number of annotators (number of annotations received) is correct, e.g., at least a minimum number and no more than a maximum number. If so, the example method 1200 continues to step 1240. Otherwise the example method 1200 continues to step 1260 (Criterion 2 for this example is satisfied).

The example method 1200 receives at step 1240 a label location table 1230. The label location table 1230 may be a table of the numerical values assigned to the labels.

At step 1240, the example method 1200 determines whether the locations of all selected label (labels marked as "Y") are within tolerance. In other words, the level of agreement here is the difference between the highest numerical value and the lowest numerical value among the selected categories. That difference is compared to a tolerance threshold. If the locations are within tolerance (difference no greater than threshold), the example method 1200 continues to step 1250 (Criterion 1 for this example is satisfied). If the locations are outside tolerance (difference greater than threshold), the example method 1200 continues to step 1270 (Criterion 3 for this example is satisfied).

For example, when the received annotations are A: very positive (+3), B: neutral (0), and C: negative (−1), and the tolerance threshold is 3, the locations are outside tolerance.

At step 1250, the example method 1200 determines an aggregated annotation to be used in training a natural language model. According to some example embodiments, the aggregated annotation may be determined as selection of the category with the numerical value closest to a mean of the numerical values of all received annotations. For example, when the received annotations are A: very positive (+3), B: neutral (0), and C: negative (−1), the aggregated annotation may be positive (+1), which is closest to the mean (+0.6667).

According to some example embodiments, the aggregated annotation may be determined as selection of the category with the numerical value closest to a median of the numerical values of all received annotations. For example, when the received annotations are A: very positive (+3), B: neutral (0), and C: negative (−1), the aggregated annotation may be neutral (0), which is closest to the median (0).

At step 1260, the example method 1200 queues the document for additional annotation. At least one human readable prompt may be generated to receive additional annotations.

At step 1270, the document is ignored. In other words, the annotations for the document are discarded and are not used for model training.

Although annotation aggregation is described with reference to FIG. 11 and FIG. 12 for classification tasks, similar algorithms may also apply to extraction tasks. In extraction tasks, in addition to the level of agreement with respect to what category or categories to select, the level of agreement with respect to locations within the document is also considered in the aggregation process.

An apparatus for generating a natural language model may comprise one or more processors configured to perform the steps described above.

A non-transitory computer readable medium may comprise instructions that, when executed by a processor, cause the processor to perform the steps described above.

Figure 13:
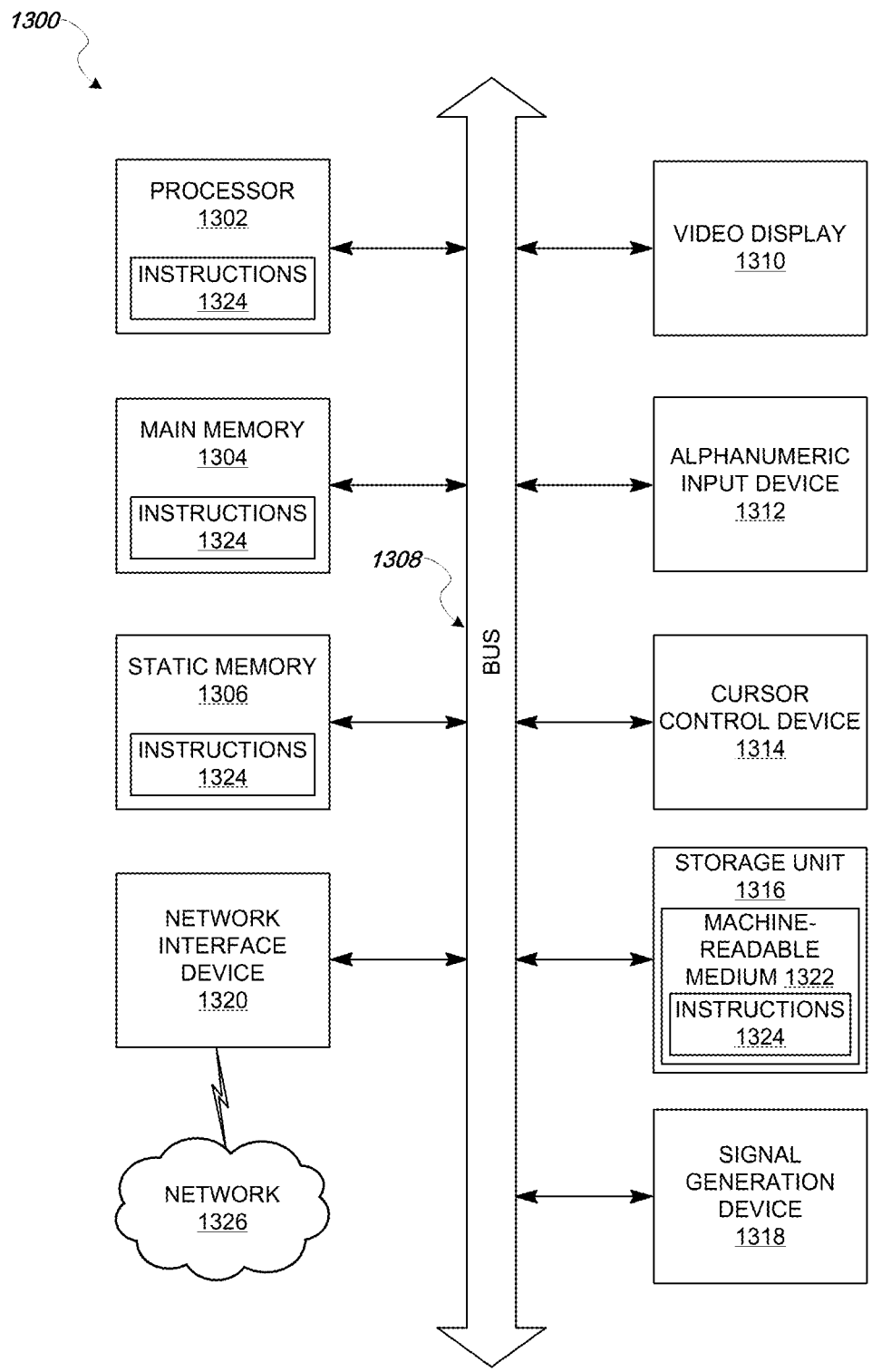
FIG. 13 is a block diagram illustrating components of a machine, according to some example embodiments, able to read instructions from a machine-readable medium and perform any one or more of the methodologies discussed herein.

Referring to FIG. 13, the block diagram illustrates components of a machine 1300, according to some example embodiments, able to read instructions 1324 from a machine-readable medium 1322 (e.g., a non-transitory machine-readable medium, a machine-readable storage medium, a computer-readable storage medium, or any suitable combination thereof) and perform any one or more of the methodologies discussed herein, in whole or in part. Specifically, FIG. 13 shows the machine 1300 in the example form of a computer system (e.g., a computer) within which the instructions 1324 (e.g., software, a program, an application, an applet, an app, or other executable code) for causing the machine 1300 to perform any one or more of the methodologies discussed herein may be executed, in whole or in part.

In alternative embodiments, the machine 1300 operates as a standalone device or may be connected (e.g., networked) to other machines. In a networked deployment, the machine 1300 may operate in the capacity of a server machine 110 or a client machine in a server-client network environment, or as a peer machine in a distributed (e.g., peer-to-peer) network environment. The machine 1300 may include hardware, software, or combinations thereof, and may, as example, be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1324, sequentially or otherwise, that specify actions to be taken by that machine. Further, while only a single machine 1300 is illustrated, the term "machine" shall also be taken to include any collection of machines that individually or jointly execute the instructions 1324 to perform all or part of any one or more of the methodologies discussed herein.

The machine 1300 includes a processor 1302 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1304, and a static memory 1306, which are configured to communicate with each other via a bus 1308. The processor 1302 may contain microcircuits that are configurable, temporarily or permanently, by some or all of the instructions 1324 such that the processor 1302 is configurable to perform any one or more of the methodologies described herein, in whole or in part. For example, a set of one or more microcircuits of the processor 1302 may be configurable to execute one or more modules (e.g., software modules) described herein.

The machine 1300 may further include a video display 1310 (e.g., a plasma display panel (PDP), a light emitting diode (LED) display, a liquid crystal display (LCD), a projector, a cathode ray tube (CRT), or any other display capable of displaying graphics or video). The machine 1300 may also include an alphanumeric input device 1312 (e.g., a keyboard or keypad), a cursor control device 1314 (e.g., a mouse, a touchpad, a trackball, a joystick, a motion sensor, an eye tracking device, or other pointing instrument), a storage unit 1316, a signal generation device 1318 (e.g., a sound card, an amplifier, a speaker, a headphone jack, or any suitable combination thereof), and a network interface device 1320.

The storage unit 1316 includes the machine-readable medium 1322 (e.g., a tangible and non-transitory machine-readable storage medium) on which are stored the instructions 1324 embodying any one or more of the methodologies or functions described herein, including, for example, any of the descriptions of FIGS. 1-12. The instructions 1324 may also reside, completely or at least partially, within the main memory 1304, within the processor 1302 (e.g., within the processor's cache memory), or both, before or during execution thereof by the machine 1300. The instructions 1324 may also reside in the static memory 1306.

Accordingly, the main memory 1304 and the processor 1302 may be considered machine-readable media 1322 (e.g., tangible and non-transitory machine-readable media). The instructions 1324 may be transmitted or received over a network 1326 via the network interface device 1320. For example, the network interface device 1320 may communicate the instructions 1324 using any one or more transfer protocols (e.g., HTTP). The machine 1300 may also represent example means for performing any of the functions described herein, including the processes described in FIGS. 1-12.

In some example embodiments, the machine 1300 may be a portable computing device, such as a smart phone or tablet computer, and have one or more additional input components (e.g., sensors or gauges) (not shown). Examples of such input components include an image input component (e.g., one or more cameras), an audio input component (e.g., a microphone), a direction input component (e.g., a compass), a location input component (e.g., a GPS receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 1322 able to store data temporarily or permanently and may be taken to include, but not be limited to, random-access memory (RAM), read-only memory (ROM), buffer memory, flash memory, and cache memory. While the machine-readable medium 1322 is shown in an example embodiment to be a single medium, the term "machine-readable medium" should be taken to include a single medium or multiple media (e.g., a centralized or distributed database, or associated caches and servers) able to store instructions 1324. The term "machine-readable medium" shall also be taken to include any medium, or combination of multiple media, that is capable of storing the instructions 1324 for execution by the machine 1300, such that the instructions 1324, when executed by one or more processors of the machine 1300 (e.g., processor 1302), cause the machine 1300 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Furthermore, the machine-readable medium 1322 is non-transitory in that it does not embody a propagating signal. However, labeling the tangible machine-readable medium 1322 as "non-transitory" should not be construed to mean that the medium is incapable of movement; the medium should be considered as being transportable from one physical location to another. Additionally, since the machine-readable medium 1322 is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium 1322 or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 1302 or a group of processors 1302) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor 1302 or other programmable processor 1302. It will be appreciated that the decision to implement a hardware module mechanically, in dedicated and permanently configured circuitry, or in temporarily configured circuitry (e.g., configured by software) may be driven by cost and time considerations.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses 1308) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 1302 that are temporarily configured (e.g., by software) or permanently configured to perform the relevant operations. Whether temporarily or permanently configured, such processors 1302 may constitute processor-implemented modules that operate to perform one or more operations or functions described herein. As used herein, "processor-implemented module" refers to a hardware module implemented using one or more processors 1302.

Similarly, the methods described herein may be at least partially processor-implemented, a processor 1302 being an example of hardware. For example, at least some of the operations of a method may be performed by one or more processors 1302 or processor-implemented modules. As used herein, "processor-implemented module" refers to a hardware module in which the hardware includes one or more processors 1302. Moreover, the one or more processors 1302 may also operate to support performance of the relevant operations in a "cloud computing" environment or as a "software as a service" (SaaS). For example, at least some of the operations may be performed by a group of computers (as examples of machines 1300 including processors 1302), with these operations being accessible via a network 1326 (e.g., the Internet) and via one or more appropriate interfaces (e.g., an API).

The performance of certain operations may be distributed among the one or more processors 1302, not only residing within a single machine 1300, but deployed across a number of machines 1300. In some example embodiments, the one or more processors 1302 or processor-implemented modules may be located in a single geographic location (e.g., within a home environment, an office environment, or a server farm). In other example embodiments, the one or more processors 1302 or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine 1300 (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The present disclosure is illustrative and not limiting. Further modifications will be apparent to one skilled in the art in light of this disclosure and are intended to fall within the scope of the appended claims.

What is claimed is:

1. A method for generating a natural language model, the method comprising:
 selecting by one or more processors in a natural language platform, from a pool of documents, a first set of documents to be annotated;
 for each document in the first set of documents, generating, by the one or more processors, a first human readable prompt configured to elicit an annotation of said document;
 receiving annotations of the first set of documents by a plurality of annotators, the annotations being elicited by the first human readable prompts;
 training, by the one or more processors, a natural language model using the annotated first set of documents;
 determining, by the one or more processors, documents in the pool having uncertain natural language processing results based on a level of disagreement among more than one annotator of the plurality of annotators;
 selecting by the one or more processors, from the pool of documents, a second set of documents to be annotated comprising one or more of the documents having uncertain natural language processing results;
 for each document in the second set of documents, generating, by the one or more processors, a second human readable prompt configured to elicit an annotation of said document;
 receiving annotations of the second set of documents elicited by the second human readable prompts; and
 retraining, by the one or more processors, a natural language model using the annotated second set of documents.

2. The method of claim 1, wherein the annotations of the first and second sets of documents comprise classification of the documents into one or more categories among a plurality of categories.

3. The method of claim 1, wherein the annotations of the first and second sets of documents comprise selection of one or more portions of the documents relevant to one or more topics.

4. The method of claim 1, wherein the steps of determining documents having uncertain natural language processing results; selecting a second set of documents to be annotated; generating a second human readable prompt; receiving annotations of the second set of documents; and retraining a natural language model using the annotated second set of documents, are repeated until the trained model has reached a predetermined performance level.

5. The method of claim 1, wherein selecting the first set of documents comprises selecting documents that are evenly distributed among different document types.

6. The method of claim 1, wherein selecting the first set of documents comprises selecting at least one document within each of a plurality of machine-discovered topics.

7. The method of claim 1, wherein selecting the first set of documents comprises selecting documents based on a keyword search.

8. The method of claim 1, wherein selecting the first set of documents comprises selecting documents based on confidence levels generated by analysis of the documents by one or more pre-existing natural language models.

9. The method of claim 1, wherein selecting the first set of documents comprises a manual selection.

10. The method of claim 1, wherein selecting the first set of documents comprises removing exact duplicates and/or near duplicates from the first set of documents.

11. The method of claim 1, wherein selecting the first set of documents comprises selecting documents based on features contained therein.

12. The method of claim 1, wherein determining documents having uncertain natural language processing results is further based on confidence levels generated by analysis of the documents by the trained model.

13. The method of claim 1, further comprising training, by the one or more processors, a plurality of additional natural language models using the annotated first set of documents, wherein determining documents having uncertain natural language processing results is further based on a level of disagreement among the plurality of additional natural language models.

14. The method of claim 13, wherein the level of disagreement among the plurality of additional natural language models is determined by assigning more weight to models with better known performance levels than models with worse known performance levels.

15. The method of claim 1, wherein the level of disagreement among the more than one annotator is determined by assigning more weight to annotators with better known performance levels than annotators with worse known performance levels.

16. The method of claim 1, wherein selecting the second set of documents comprises selecting documents similar to documents that have a high level of disagreement among the more than one annotator.

17. The method of claim 1, wherein the second human readable prompt is configured to elicit a true-or-false answer aimed at resolving uncertainty in the natural language processing results.

18. The method of claim 16, wherein the selection of documents similar to documents that have a high level of disagreement is based on text or metadata similarity.

19. An apparatus for generating a natural language model, the apparatus comprising one or more processors configured to:
 select, from a pool of documents, a first set of documents to be annotated;
 for each document in the first set of documents, generate a first human readable prompt configured to elicit an annotation of said document;
 receive annotations of the first set of documents by a plurality of annotators, the annotators being elicited by the first human readable prompts;
 train a natural language model using the annotated first set of documents;
 determine documents in the pool having uncertain natural language processing results based on a level of disagreement among more than one annotator of the plurality of annotators;

select, from the pool of documents, a second set of documents to be annotated comprising one or more of the documents having uncertain natural language processing results;

for each document in the second set of documents, generate a second human readable prompt configured to elicit an annotation of said document;

receive annotations of the second set of documents elicited by the second human readable prompts; and retrain a natural language model using the annotated second set of documents.

20. A non-transitory computer readable medium comprising instructions that, when executed by a processor, cause the processor to:

select, from a pool of documents, a first set of documents to be annotated;

for each document in the first set of documents, generate a first human readable prompt configured to receive annotations of the first set of documents by a plurality of annotators;

train a natural language model using the annotated first set of documents;

determine documents in the pool having uncertain natural language processing results based on a level of disagreement among more than one annotator of the plurality of annotators;

select, from the pool of documents, a second set of documents to be annotated comprising one or more of the documents having uncertain natural language processing results;

for each document in the second set of documents, generate a second human readable prompt configured to receive annotations of the second set of documents; and retrain a natural language model using the annotated second set of documents.

* * * * *